(12) United States Patent
Thibault et al.

(10) Patent No.: US 6,650,413 B2
(45) Date of Patent: Nov. 18, 2003

(54) LINEAR SPECTROMETER

(75) Inventors: Simon Thibault, Sainte-Foy (CA); Carl Paquet, San Jose, CA (US)

(73) Assignee: Institut National d'Optique, Quebec (CA)

( * ) Notice: Subject to any disclaimer, the term of this patent is extended or adjusted under 35 U.S.C. 154(b) by 75 days.

(21) Appl. No.: 09/952,718

(22) Filed: Sep. 12, 2001

(65) Prior Publication Data

US 2002/0054289 A1 May 9, 2002

Related U.S. Application Data

(63) Continuation-in-part of application No. 09/406,579, filed on Sep. 24, 1999, now Pat. No. 6,445,508.

(30) Foreign Application Priority Data

Aug. 8, 1999   (CA) ............................................... 2280531

(51) Int. Cl.[7] ................ G01J 3/28; G01J 3/18
(52) U.S. Cl. ...................................................... 356/328
(58) Field of Search ................................ 356/326, 328, 356/305, 334

(56) References Cited

U.S. PATENT DOCUMENTS

| | | | |
|---|---|---|---|
| 4,695,132 A | | 9/1987 | Sakuma |
| 4,707,056 A | * | 11/1987 | Bittner ........................ 356/326 |
| 4,770,517 A | | 9/1988 | Sakuma |
| 4,786,174 A | | 11/1988 | Witte |
| 5,565,983 A | * | 10/1996 | Barnard ....................... 356/328 |

FOREIGN PATENT DOCUMENTS

| | | |
|---|---|---|
| EP | 0 595 533 | 5/1994 |
| JP | 09089668 | 4/1997 |

OTHER PUBLICATIONS

Saslan, et al., "Design assembly, and testing of an objective lens for a free–space photonic switching system", Optical Engineering, 32 (1993) Aug., No. 8, pp. 1871–1877.

* cited by examiner

*Primary Examiner*—F. L. Evans
(74) *Attorney, Agent, or Firm*—Merchant & Gould P.C.

(57) ABSTRACT

A linear spectrometer for spectrally measuring an optical signal. The spectrometer has an input receiving the signal which is then diffracted onto a diffraction grating. The signal is therefore divided into its spectral components, each component being diffracted at an angle θ. A correcting element, such as a lens, a group of lenses, a mirror, etc. is provided for focusing the spectral components on an image plane where they are detected. The correcting element is designed so that the resulting distribution of the spectral components on the image plane is linear with respect to the component's wavelength.

14 Claims, 10 Drawing Sheets

LINEAR SPECTROMETER

RELATED APPLICATION

The present application is a continuation-in-part of Ser. No. 09/406,579 filed on Sep. 24, 1999, now U.S. Pat. No. 6,445,508.

BACKGROUND OF THE INVENTION

1. Field of the invention

The present invention relates to lenses used in optical systems and, more particularly to a new lens or a new lens group. It also relates to a linear spectrometer based on such a lens or lens group.

2. Description of the Prior Art

A spectrometer generally uses a diffraction grating to spread the spectral components of incident light on a one-dimensional detector. The detector is usually composed of pixels linearly distributed along a line. However, the diffracted light is not spread linearly on the detector, which means that the wavelength on pixel 1 is not linearly correlated with the wavelength on the pixel 2, and so on from pixel to pixel. The resolution is therefore not constant for all the spectral range of the spectrometer. To know which pixel corresponds to which wavelength, a complex calibration process must be applied very carefully to prevent errors.

It would thus be desirable to have an optical system that would yield a linear output when used with a diffraction grating, thereby substantially eliminating a time consuming calibration process. This optical system would introduce the desirable amount of distortion to obtain a linear relation between pixel position and wavelength.

Introducing the desired amount of distortion in an optical system is possible and relatively straight forward for optical designers. For example, known fθ lenses (as in U.S. Pat. No. 4,695,132 issued on Sep. 22, 1987 to Sakuma and No. 4,770,517 issued on Sep. 13, 1988 also to Sakuma) used in laser scanner systems are one of the most popular lenses using distortion to get a linear output plane. In this case, the linearity is related to the scanning angle.

The height of the image position in a single element optical system is proportional to the tangent of the incident angle on the optical system. In order to have linearity with the wavelength, the optical system when used with a diffraction grating must introduce distortion in such a way that the relation of the height of the image respects the relation A f sin(θ), where A is a constant, f is the focal length of the optical system and θ the angle of incidence. This condition is described in co-pending U.S. application Ser. No. 09/406,576 of Sep. 24, 1999, assigned to the same assignee.

This technique is more powerful than the one proposed in U.S. Pat. No. 4,786,174 issued on Nov. 22, 1988. In the arrangement proposed in the latter patent, an optimal linearity of the wavelength scale on the plane of detector can be achieved. We suggest a technique to obtain exact linearity of the wavelength scale on the plane of detector. The level of error is fixed by the designer during the design process.

OBJECTS AND SUMMARY OF THE INVENTION

Accordingly, it is an object of the present invention to provide a new and improved spectrometer.

It is also an aim of the present invention to provide a spectrometer which combines simultaneously the f sin(θ) characteristic for obtaining a linear scale of the wavelength on the image plane and a well-corrected image plane for each spectral component.

The present invention therefore provides a linear spectrometer for spectrally measuring an optical signal. The spectrometer includes an input for receiving the optical signal along an optical axis, and a diffraction grating for separating the received optical signal into spectral components thereof, each spectral component being diffracted at a diffraction angle θ from the optical axis. An optical correcting element having an effective focal length f is provided, this optical correcting element focusing the spectral components on an image plane in accordance with an f sin(θ) distribution. Detecting means are further provided for detecting the spectral components in the image plane.

If an f-sin(θ) lens or lens group is introduced for instance in a spectrometer, this new lens provides a correction for the deflection of the laser beam which takes place at a linear position with the wavelength in the detector plane. Specifically, when the diffraction grating is positioned on the entrance pupil of the f-sin(θ) lens having an effective focal length of f, with respect to the optical axis thereof, the beam will be focused onto the detector plane at a point which is displaced by a distance of f-sin(θ) from the optical axis. According to the grating equation at normal incidence $$\sin(\theta) = \frac{m \cdot \lambda}{n \cdot \Lambda},$$

where θ is the diffraction angle, m is the diffraction order, λ is the wavelength, n the index of the refraction and Λ the grating period, the distance from the optical axis of the focused beam is a linear function of the wavelength. Then the calibration can be simplified because the spectral component of a light signal spread on the detector is linearly distributed on the linear detector. Furthermore, the resolution is constant over the wavelength operating range. The designation "f sin(θ) lens", or "f-λ lens", is derived from such a fact.

The present invention can solve the problem associated with the non-linear imaging process in the spectrometer and it can also solve other problems. This invention is intended to provide a new lens or lens group which can be used with a diffraction grating to provide a linear output plane with the wavelength (λ), but also with the order of diffraction (m), or with the grating spatial frequency (1/Λ), or with the inverse of the index of refraction (n).

Accordingly, the invention provides a new lens or a new lens group with the proper amount of distortion to provide an f-Sin(θ) characteristic. The optical lens or lens group of the present invention has a positive or a negative power and it can be refractive, diffractive and reflective or a combination of all these properties.

BRIEF DESCRIPTION OF THE DRAWINGS

Having thus generally described the nature of the invention, reference will now be made to the accompanying drawings, showing by way of illustration of a preferred embodiment thereof, and in which.

DESCRIPTION OF THE PREFERRED EMBODIMENTS

Description of the f sin(θ) Lens System

Figure 1:
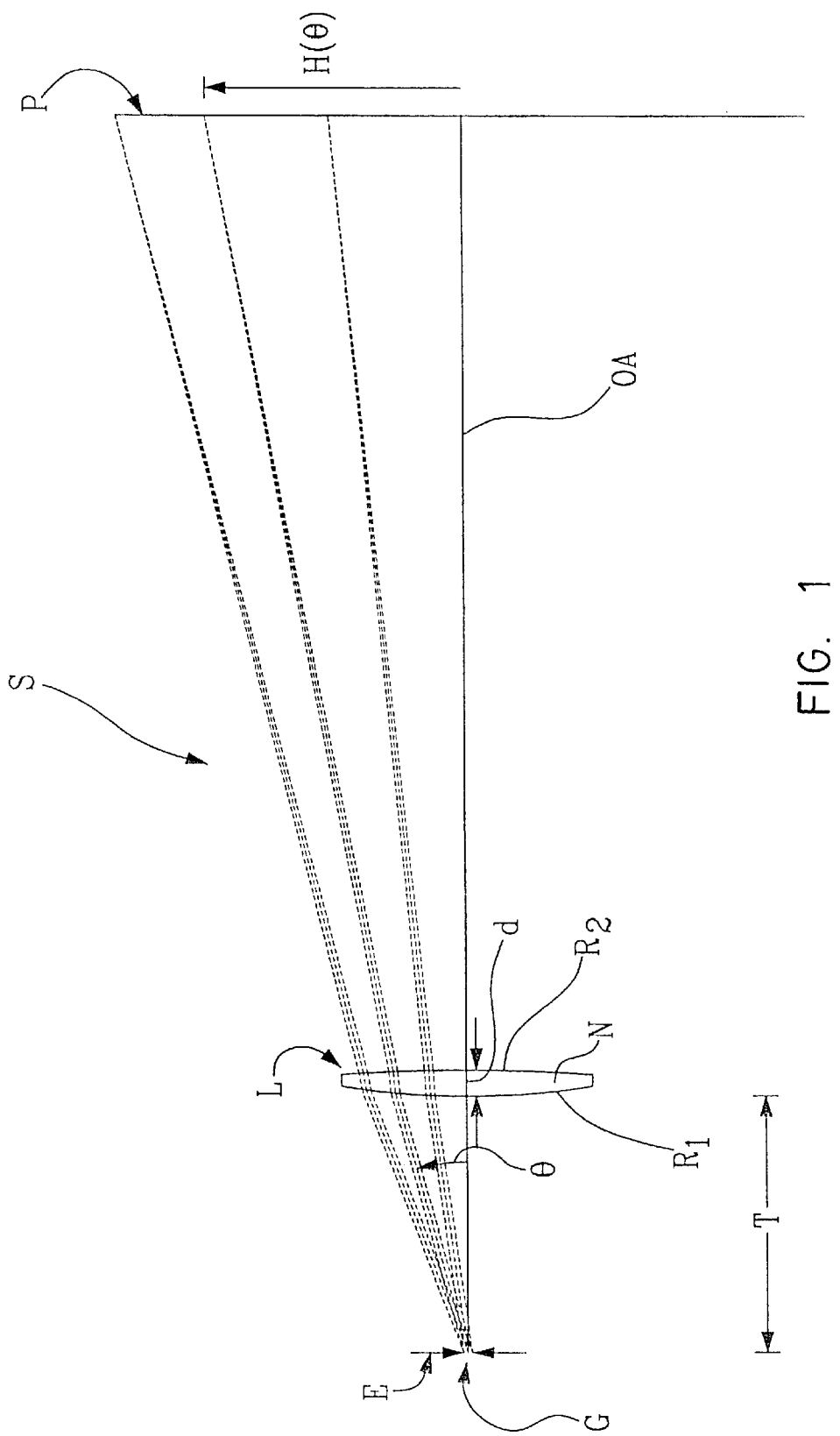
FIG. 1 is the optical layout of the refractive configuration of a f sin(θ) single lens in accordance with the present invention.

The f sin(θ) lens system of the present invention represents in its most simple arrangement a single lens L, as shown in FIG. 1. As shown, a radius of curvature of a first surface is represented by R1, a radius of curvature of a second opposed surface by R2, the separation between the lens surface R1 and R2 by d, and the index of refraction of the lens L is represented by N. The variables described above, form the lens L. The lens variables are calculated to minimize the f sin(θ) characteristic. This can be done by a proper merit function in any optical design software.

The f sin(θ) characteristic can be defined by $$f \cdot \sin(\theta)_{charateristic} = \frac{H(\theta) - f \cdot \sin(\theta)}{f \cdot \sin(\theta)} \cdot 100,$$

where θ represents the diffraction angle from the diffraction grating and H(θ) corresponds to the height of the focused beam in the image plane with respect to the optical axis of the focused beam. The f sin(θ) characteristic signifies a deviation from an ideal f sin(θ) characteristic, in percentage. For an ideal f sin(θ) lens or lens group, H(θ)=f sin(θ) for every angle of incidence, and the f sin(θ) characteristic is equal to zero.

Figure 2:
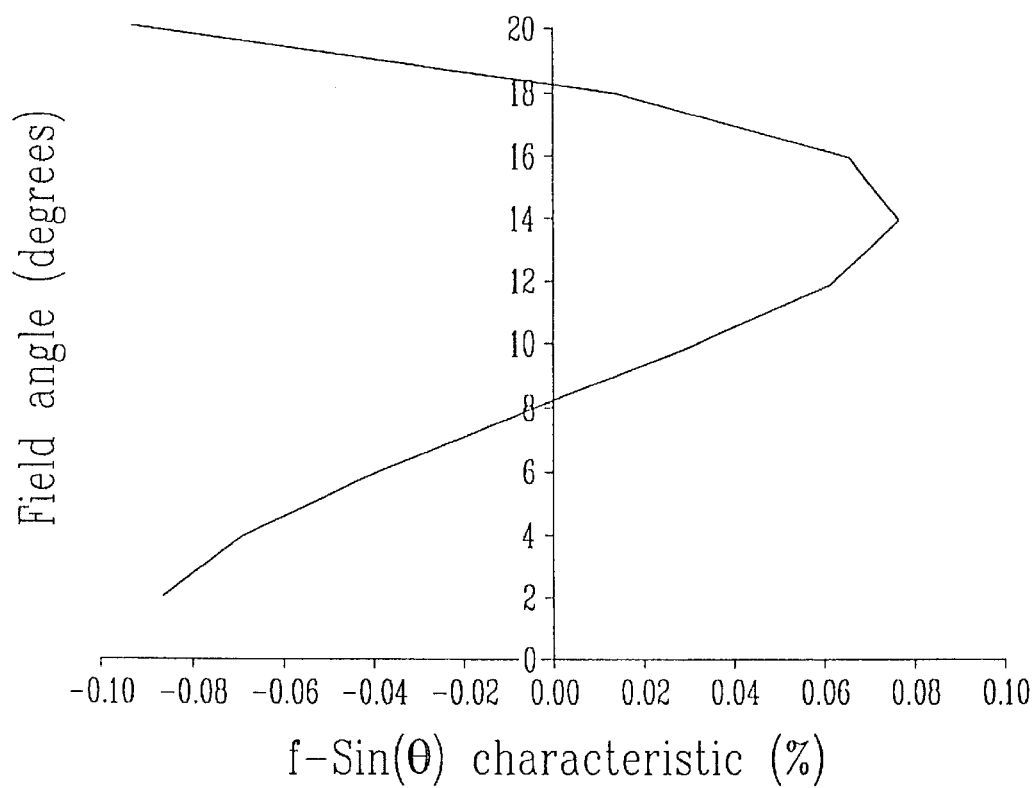
FIG. 2 graphically illustrates the f sin(θ) correction in the arrangement of FIG. 1.

The permissible values of the f sin(θ) characteristic are difficult to evaluate, it may depend on the kind of application. It is relatively easy to use ±0.1% as a good starting point. This value is a typical number used for the fθ lens. FIG. 2 shows the f sin(θ) characteristic of the lens of FIG. 1.

It is a second object of the present invention to provide a new optical system S. This new system combines the f sin(θ) lens and a diffraction grating. The main optical elements of the new optical system S are comprised of a diffraction grating G placed on the entrance pupil E of the f sin(θ) lens (see FIG. 1), the f sin(θ) lens L, and an image plane P which in the illustrated embodiments take the form of a focal plane (in other cases, the image plane could be a conjugated plane). The optical system S of the present invention operates by transmitting a light beam, for instance a collimated light beam, from a light source through the diffraction grating G, the diffracted light passes through the f sin(θ) lens L, and is focused in the image plane P.

If the light incident on the grating G is polychromatic, the diffraction grating G spreads the light in the "m" order of diffraction (m=1, for example). Then, the position of the light spread in the image plane P is directly proportional to the wavelength of the light. We can derive this fact from the grating equation:

$$H(\theta) = f \cdot \sin(\theta) = f \cdot \frac{m \cdot \lambda}{n \cdot \Lambda} = A \cdot \lambda = H(\lambda)$$

As we can see, the height H(θ) is a linear function of the variable λ (i.e. the light's wavelength). To respect the linearity, the order of diffraction (m), the index (n) and the grating period (Λ) must be constant.

The designation "f-λ lens" is derived from such a fact.

If the light incident on the grating G is monochromatic, and the diffraction grating G diffracts the laser beam into several diffraction orders, the position of a given diffraction order in the image plane P is then directly proportional to the diffraction order produced by the diffraction grating following the equation:

$$H(\theta) = f \cdot \sin(\theta) = f \cdot \frac{m \cdot \lambda}{n \cdot \Lambda} = B \cdot m = H(m)$$

As we can see, the height H(θ) is a linear function of the variable m (that is the order of diffraction). To respect the linearity, the wavelength (λ), the index (n) and the grating period (Λ) must be constant.

If the light incident on the grating G is monochromatic, and the diffraction grating diffracts the laser beam into one diffraction order, the position of the diffracted light in the image plane P is then directly proportional to the spatial frequency of the diffraction grating following the equation:

$$H(\theta) = f \cdot \sin(\theta) = f \cdot \frac{m \cdot \lambda}{n \cdot \Lambda} = C \cdot \frac{1}{\Lambda} = H\left(\frac{1}{\Lambda}\right)$$

As we can see, the height H(θ) is a linear function of the variable 1/Λ that is the reverse of the grating period). To respect the linearity, the wavelength (λ), the index (n) and the diffraction order (m) must be constant.

If the light is not normal incident but made an angle β with the diffraction grating normal GN (see FIG. 7) on the diffraction grating G, the linearity is respected as the following equation:

$$H(\theta) = f \cdot \sin(\theta) = f \cdot \left(\frac{m \cdot \lambda}{n \cdot \Lambda} + \sin(\beta)\right)$$
$$= A\lambda + E$$
$$= Bm + E$$
$$= C\frac{1}{\Lambda} + E$$

where E is a new constant equal to the following equation:

$$E = f \cdot \sin(\beta)$$

The diffraction grating may be plane, convex or concave, and other possible gratings may be used, for instance an aspheric diffraction grating.

Examples of Preferred Embodiments of the Lens System

All optical surfaces of the present invention respect the following sag equation:

$$z(r) = \frac{c \cdot r^2}{1 + \sqrt{1 - (1+\delta) \cdot c^2 \cdot r^2}},$$

where c is the curvature (the reciprocal of the radius of curvature (1/R), r is the radial coordinate and δ is the conic constant.

FIG. 1 shows the single f-Sin(θ) lens with the following prescription:

| R1 = 73.28 mm | d = 2.7 mm | Material: BK7 | F/# = 100 |
| R2-173.26 mm | T = 27 mm | | EFL = 100 mm | where F/# is the effective focal length divided beam diameter where EFL is the effective focal length.

Design wavelengths 486.1 nm 587.6 nm (primary) 656.3 nm.

The corresponding f sin(θ) characteristic is shown in FIG. 2.

Figure 3:
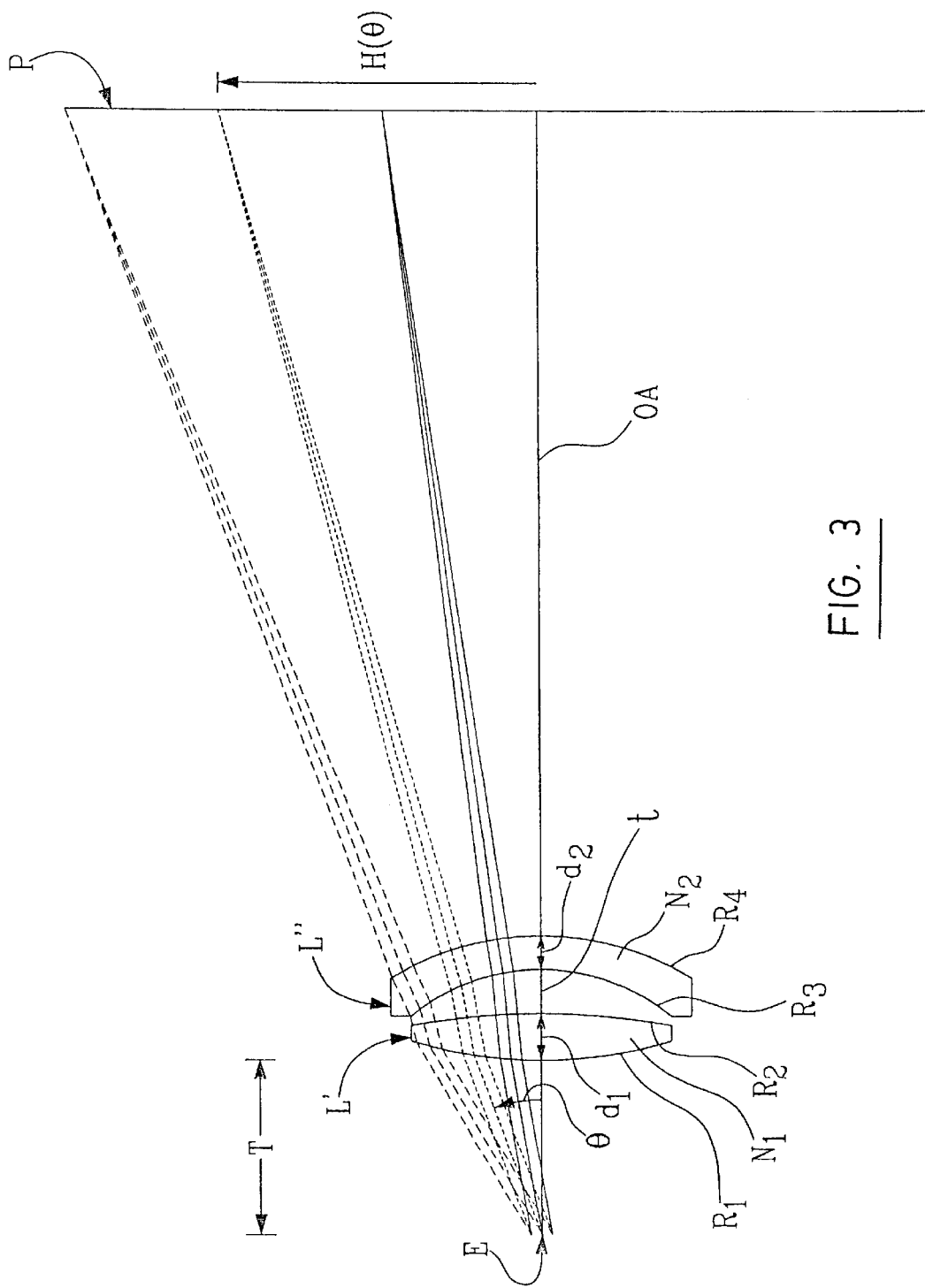
FIG. 3 is the optical layout of the refractive configuration of a f sin(θ) doublet also in accordance with the present invention.

FIG. 3 shows the two air space element f sin(θ) doublet lens with the following prescription:

| R1 = 50.05 mm | d1 = 5 mm | N1 = 1.5168 | F/# = 40 |
| R2 = −65.24 mm | t = 5 mm | | T = 19.6 mm |
| R3 = −21.10 mm | d2 = 3.55 mm | N2 = 1.7847 | EFL = 100 mm |
| R4 = −28.86 mm | | | |
| Design wavelengths | 486.1 nm | 587.6 nm (primary) | 656.3 nm |

In FIG. 3, the f sin(θ) doublet comprises a first proximal lens L' having opposed surfaces R1 and R2, and a second distal lens L" having opposed surfaces R3 and R4, respectively separated by distances d1 and d2 and having respective indexes of refraction N1 and N2.

Figure 4:
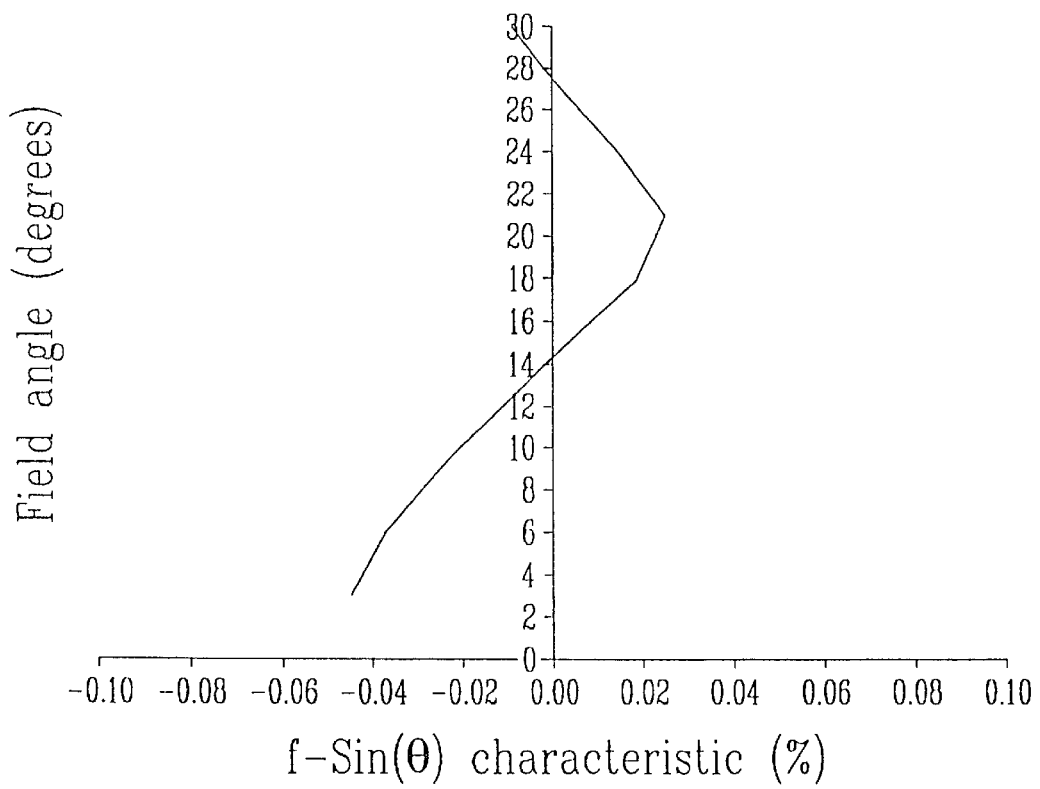
FIG. 4 graphically illustrates the f sin(θ) correction in the arrangement of FIG. 3.

The corresponding f sin(θ) characteristic is shown in FIG. 4. The lenses L' and L" are separated by distance t.

Figure 5:
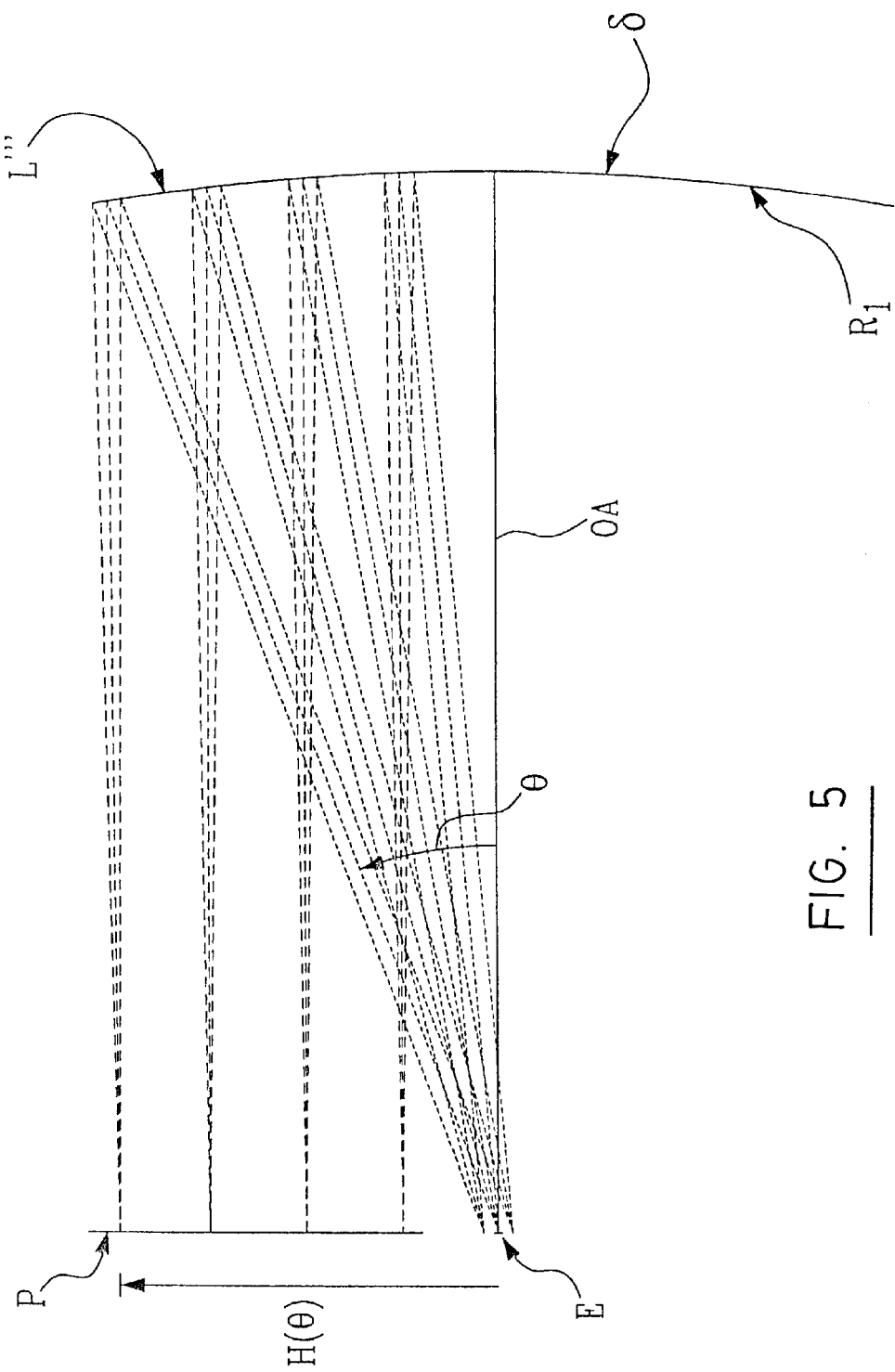
FIG. 5 is the optical layout illustration of a reflective configuration of the f sin(θ) lens further in accordance with the present invention.

FIG. 5 shows a reflective configuration of an f sin(θ) lens L'". This embodiment can be used when a large bandwidth is required in various applications. The optical prescriptions are:

| R1 = −200 mm | T = 100 mm | F/# = 40 |
| δ = 0.908 mm | | EFL = 100 mm |

Design wavelengths 486.1 nm 587.6 nm (primary) 656.3 nm

In FIG. 5, the lens L'" comprises a reflective surface R1 with a conical constant 8.

Figure 6:
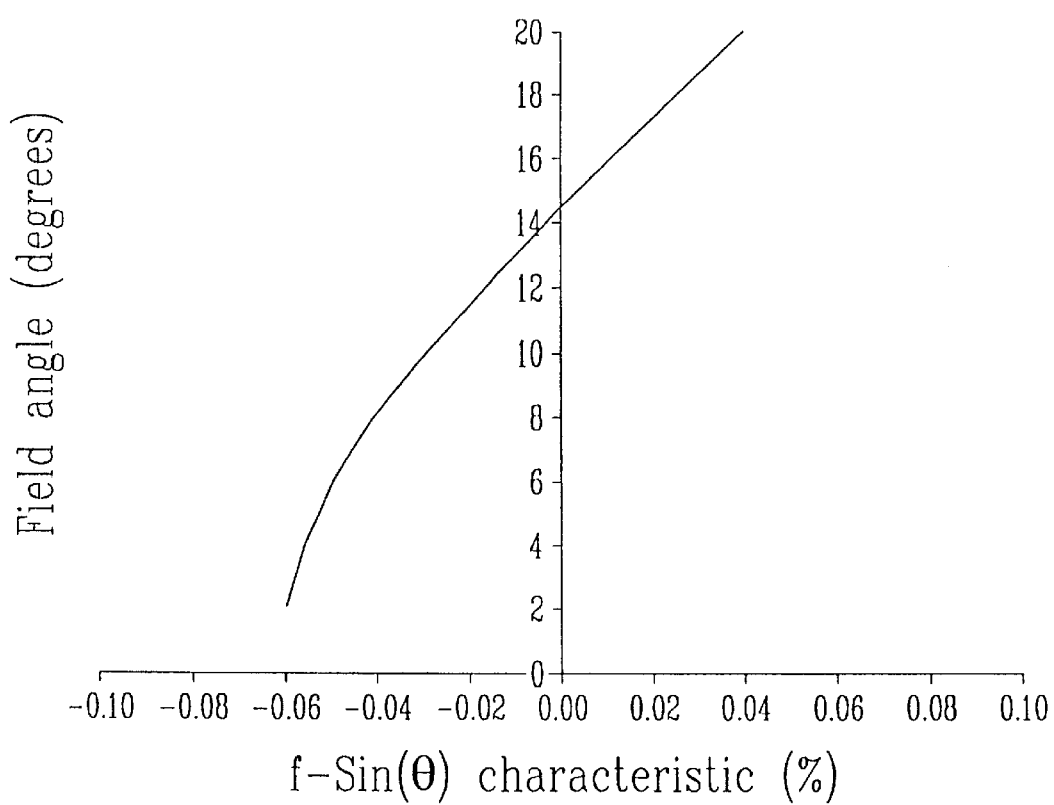
FIG. 6 graphically illustrates the f sin(θ) correction in the arrangement of FIG. 5.

The corresponding f sin(θ) characteristic is shown in FIG. 6.

Figure 7:
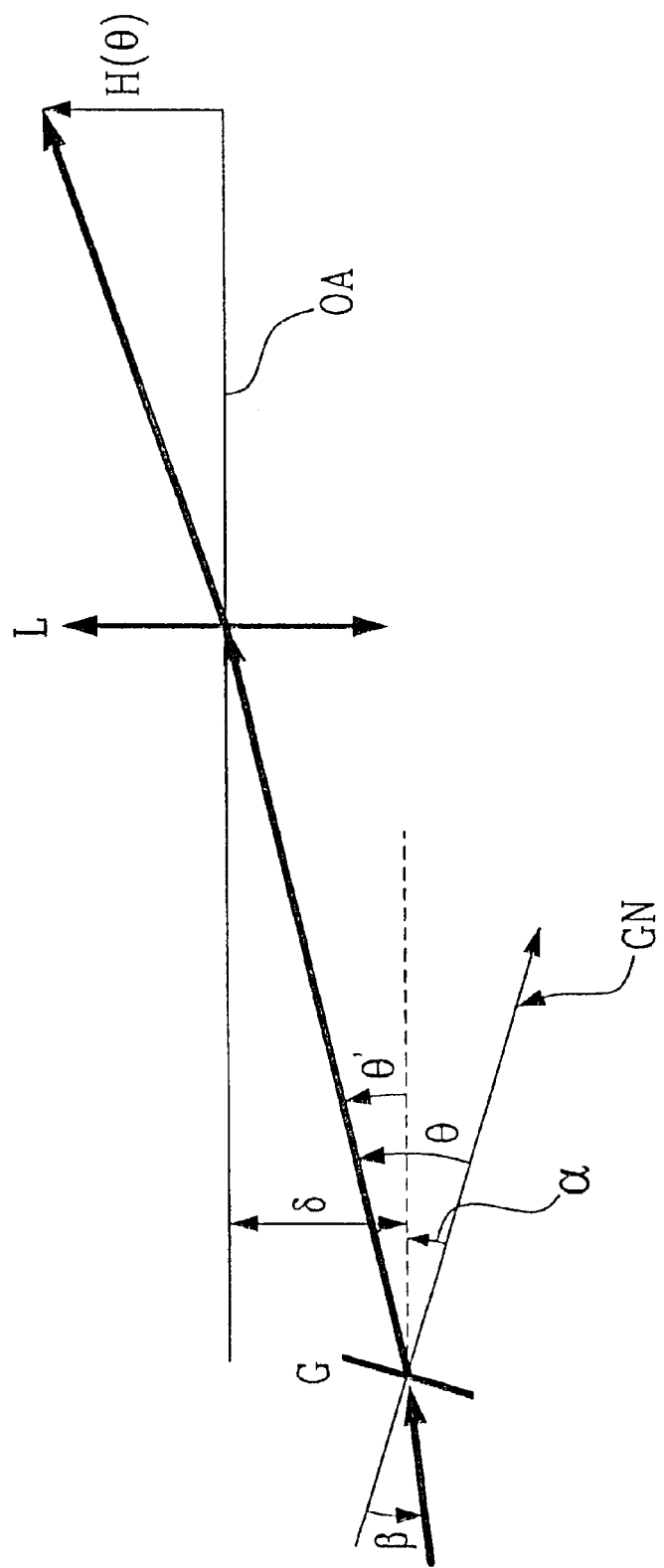
FIG. 7 is a schematic view of the diffraction grating and the lens with the diffraction angle and the incident angle are different.

The invention is also valid when the normal of the grating (GN) makes an angle α with the optical axis of the f sin(θ) lens or lens group as we can see in FIG. 7. However, in this particular case, the diffraction angle θ is not equal to the incident angle on the f sin(θ) lens. The definition of H(θ) is the same as presented above but for the incident angle on the lens, we can express the relation as:

$$H(\theta) = H(\theta') = f \cdot \sin(\theta' + \alpha)$$

where θ' is the incident angle on the lens respecting the optical axis (OA). The angles are positive as shown in FIG. 7.

A distance δ between the optical axis of the lens and the center of the diffraction grating is also possible. In such a case, the invention is also valid.

Description of a Linear Spectrometer

Figure 8:
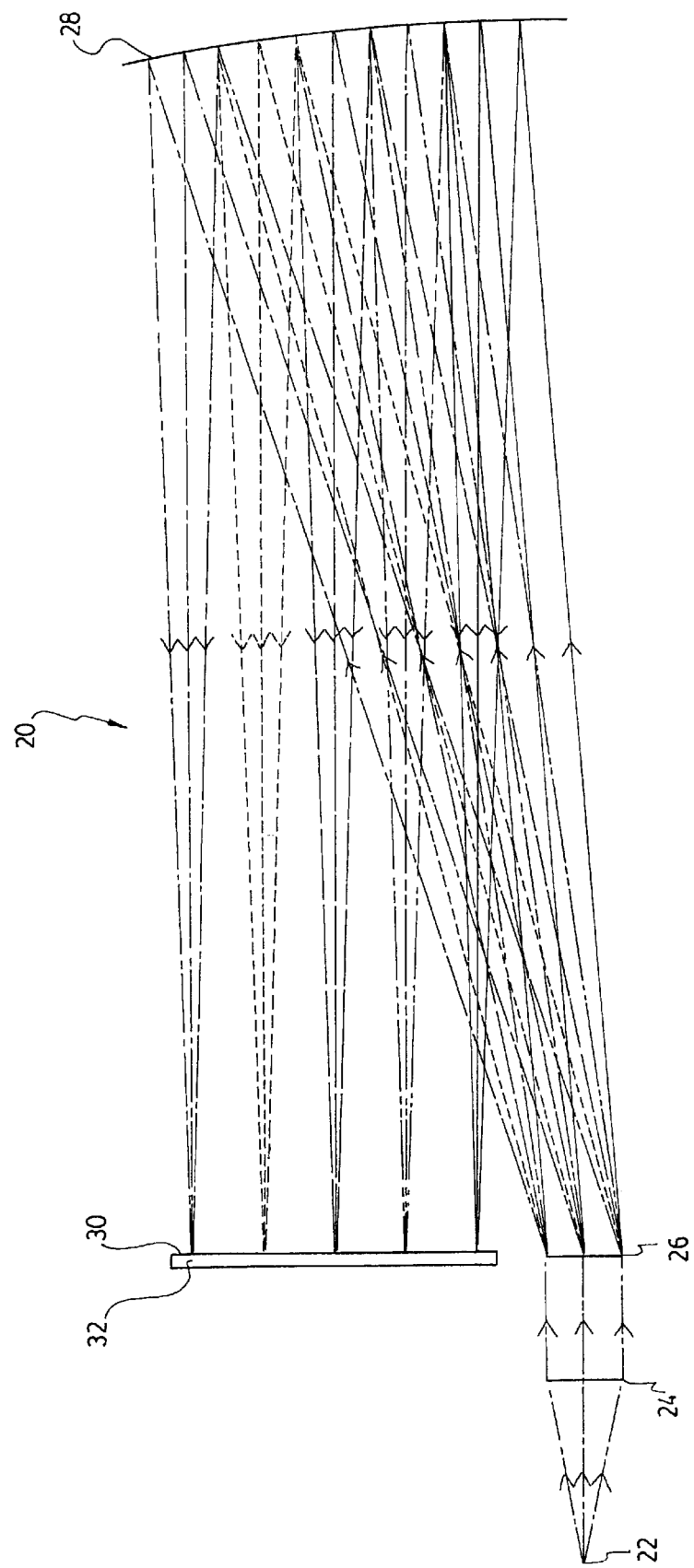
FIG. 8 is the optical layout of the linear spectrometer in accordance with the present invention.

With reference to FIG. 8, there is shown a linear spectrometer 20 according to a preferred embodiment of the invention.

The spectrometer 20 has an input 22 for receiving an optical signal, the input being embodied by a slit, an end of an optical fiber, or any other appropriate device. In the preferred embodiment, the signal is collimated by a collimator 24, for example a concave reflector.

A diffraction grating 26 is provided in the path of the optical signal for separating this signal into its spectral components. As explained above, each component may be diffracted into one or several diffraction orders at an angle θ from the optical axis of the incoming signal. In the illustrated embodiment a plane grating is used, but other possibilities could also include a concave or convex grating, an aspheric diffraction grating, etc.

The diffracted spectral components of the signal are then incident on an optical correcting element 28. The designation "optical correcting element" is used herein to describe any optical component or group of components having the effect of focusing the spectral components on an image plane 30 in accordance with an f sin(θ) distribution. It could be embodied by a lens, a group of lenses, a mirror, etc. In the illustrated embodiment, a concave mirror is used, but the invention is in no way limited to such an embodiment.

Detecting means such as linear photodetector 32 are provided in the image plane 30 for detecting the spectral components.

Any other configuration of the above elements may be used without departing from the scope of the invention. For example, the spectrometer could be a modified version of a Czerny-Turner configuration using a reflective collimator and a reflective grating. Alternatively, an integrated version may be considered, where the spectrometer is included into a slab of material defining a waveguide, guiding light by internal reflections along the direction normal to the plane of FIG. 8.

The optimization of the image plane and of the linear wavelength scale can be achieved by introducing the proper amount of distortion during the design process. The merit function must be defined in such a way that the linear scale is obtained with proper defined tolerances. The linear wavelength scale is obtained by a variation of the optical distance between optical elements which compose the spectrometer, and the shape of the concave mirror such as the radius of curvature, the conic constant and the aspheric coefficients.

Using an f sin(θ) relation in a spectrometer, we obtain a linear output distribution of the wavelength spectrum into the detector plane. This linearity is important during the calibration process. Calibrating the wavelength of a spectrometer of the prior art is not straightforward. The calibration process is done to identify the relationship between the pixel number and the wavelength and is at least third-order polynomial equation, $$\lambda = \lambda_0 + A \cdot p + B \cdot p^2 + C \cdot p^3$$

where λ is the wavelength of pixel p, $\lambda_0$ is the wavelength of pixel 0, A is the first coefficient (nm/pixel), B is the second coefficient (nm/pixel$^2$), and C is the third coefficient (nm/pixel$^3$) and so on. Using several wavelengths, the precision will increase and better results can be obtained. Four wavelengths are necessary for the calibration process.

With the present invention, the relation between the wavelength and the pixel is linear. The above relationship is then reduced to a first order polynome. By using only two separated wavelengths one will get the calibration coefficient. The level of linearity is achieved by the design process.

Figure 9:
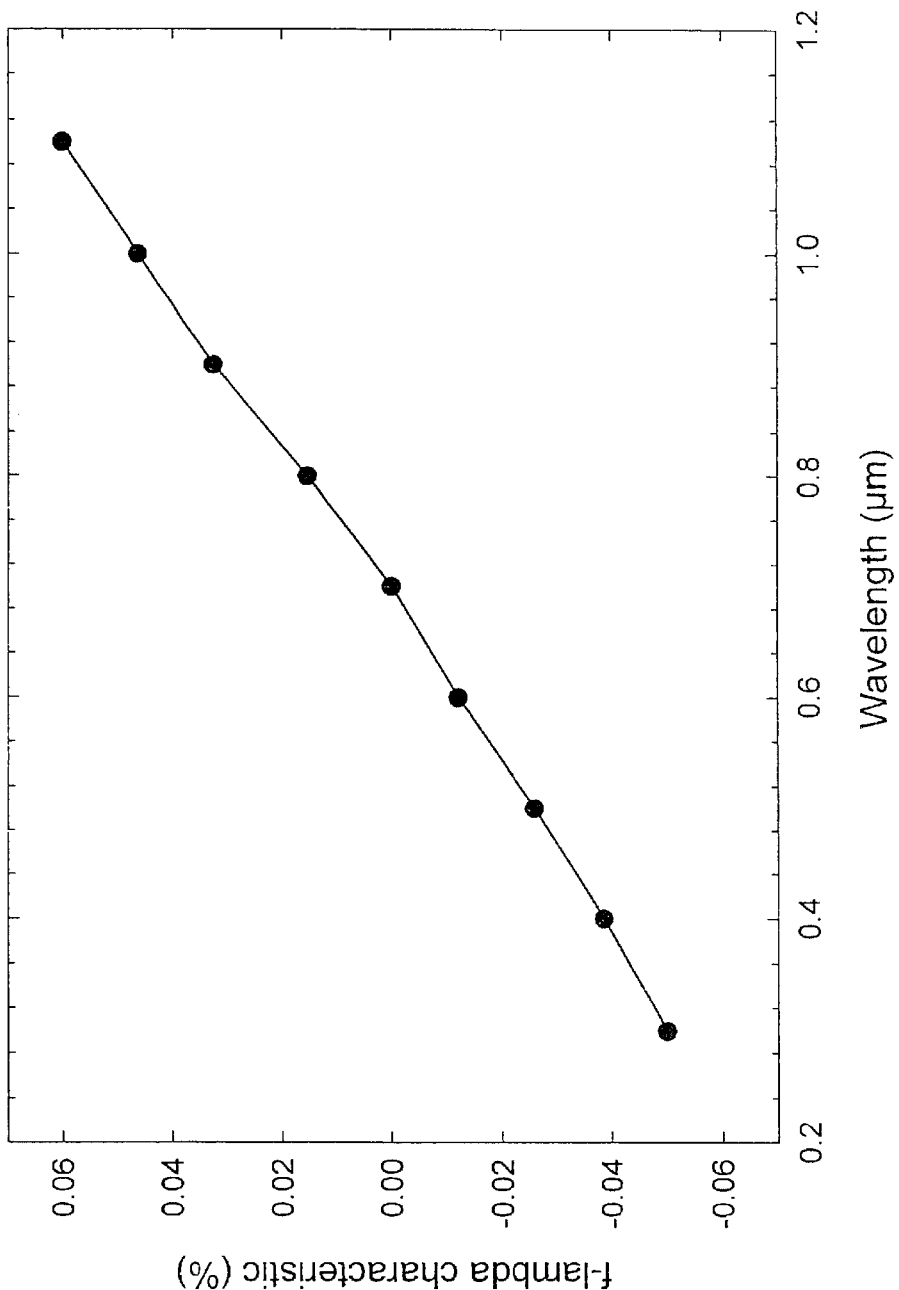
FIG. 9 graphically illustrates the f-lambda characteristic in the arrangement of FIG. 8.
Figure 10:
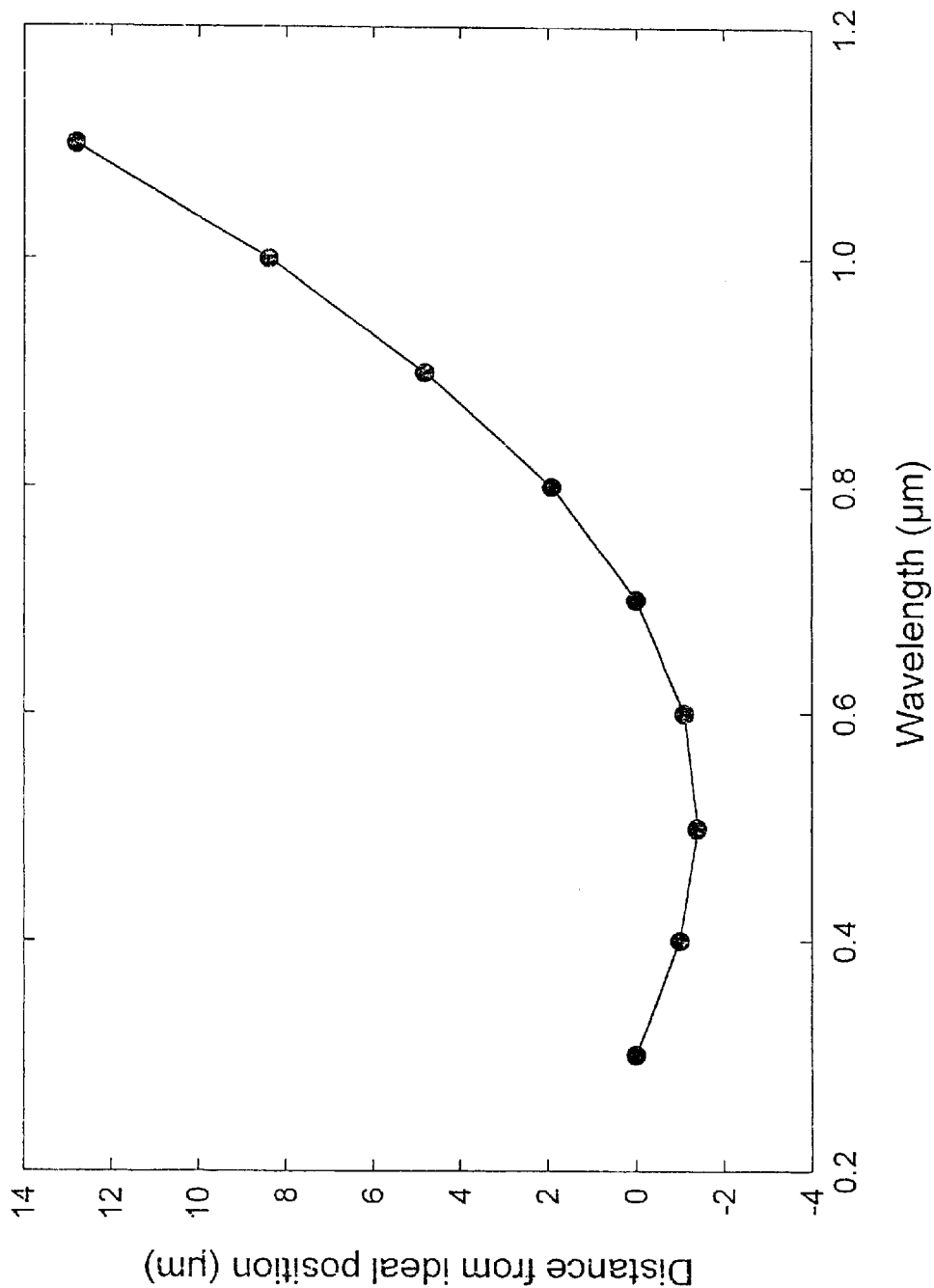
FIG. 10 graphically illustrates the deviation of the beam position related to the ideal position in the arrangement of FIG. 8.

FIG. 9 shows the performance of the f sinθ lens used in the preferred embodiment. The f-lambda characteristic is defined as the difference in percent between the design position of the wavelength in the output plane and its ideal position if the lens was perfect. As shown, the f-lambda characteristic is always under 0.1% which is very good. But for pixel application, the absolute difference between the exact position and the design position must be less than the pixel dimension because the wavelength has to be located into the right pixel. FIG. 10 shows the absolute distance difference between the ideal position (pixel center) and the design position that the lens can achieve.

Of course, numerous modifications could be made to the embodiments described above without departing from the scope of the invention as defined in the appended claims.

What is claimed is:

1. A linear spectrometer for spectrally measuring an optical signal, comprising:
   an input far receiving said optical signal along an optical axis;
   a diffraction grating for separating the optical signal received at the input into spectral components thereof, each spectral component being diffracted at a diffraction angle θ from said optical axis;
   an optical correcting element having an effective focal length f, said optical correcting element focusing said spectral components on an image plane in accordance with an f sin(θ) distribution, wherein said optical correcting element comprises a group of lenses; and
   detecting means for detecting said spectral components in the image plane.

2. A linear spectrometer according to claim 1, wherein said input is a slit.

3. A linear spectrometer according to claim 1, wherein said input is an end of an optical fiber.

4. A linear spectrometer according to claim 1, further comprising a collimator for collimating the optical signal received at the input.

5. A linear spectrometer according to claim 4, wherein said collimator comprises a concave reflector.

6. A linear spectrometer according to claim 1, wherein said diffraction grating is a plane grating.

7. A linear spectrometer according to claim 1, wherein said detecting means comprise a linear photodetector.

8. A linear spectrometer for spectrally measuring an optical signal, comprising:
   an input for receiving said optical signal along an optical axis;
   a diffraction grating for separating the optical signal received at the input into spectral components thereof, each spectral component being diffracted at a diffraction angle θ from said optical axis;
   an optical correcting element having an effective focal length f, said optical correcting element focusing said spectral components on an image plane in accordance with an f sin(θ) distribution, wherein said optical correcting element comprises a mirror; and
   detecting means for detecting said spectral components in the image plane.

9. A linear spectrometer according to claim 8, wherein said mirror is concave.

10. A linear spectrometer according to claim 8, wherein said input is a slit.

11. A linear spectrometer according to claim 8, wherein said input is an end of an optical fiber.

12. A linear spectrometer according to claim 8, further comprising a collimator for collimating the optical signal received at the input.

13. A linear spectrometer according to claim 8, wherein said diffraction grating is a plane grating.

14. A linear spectrometer according to claim 8, wherein said detecting means comprise a linear photodetector.

* * * * *